March 13, 1956  M. P. WINTHER  2,738,044
ELECTROMAGNETIC PLATE CLUTCH
Filed Jan. 18, 1951  4 Sheets-Sheet 1
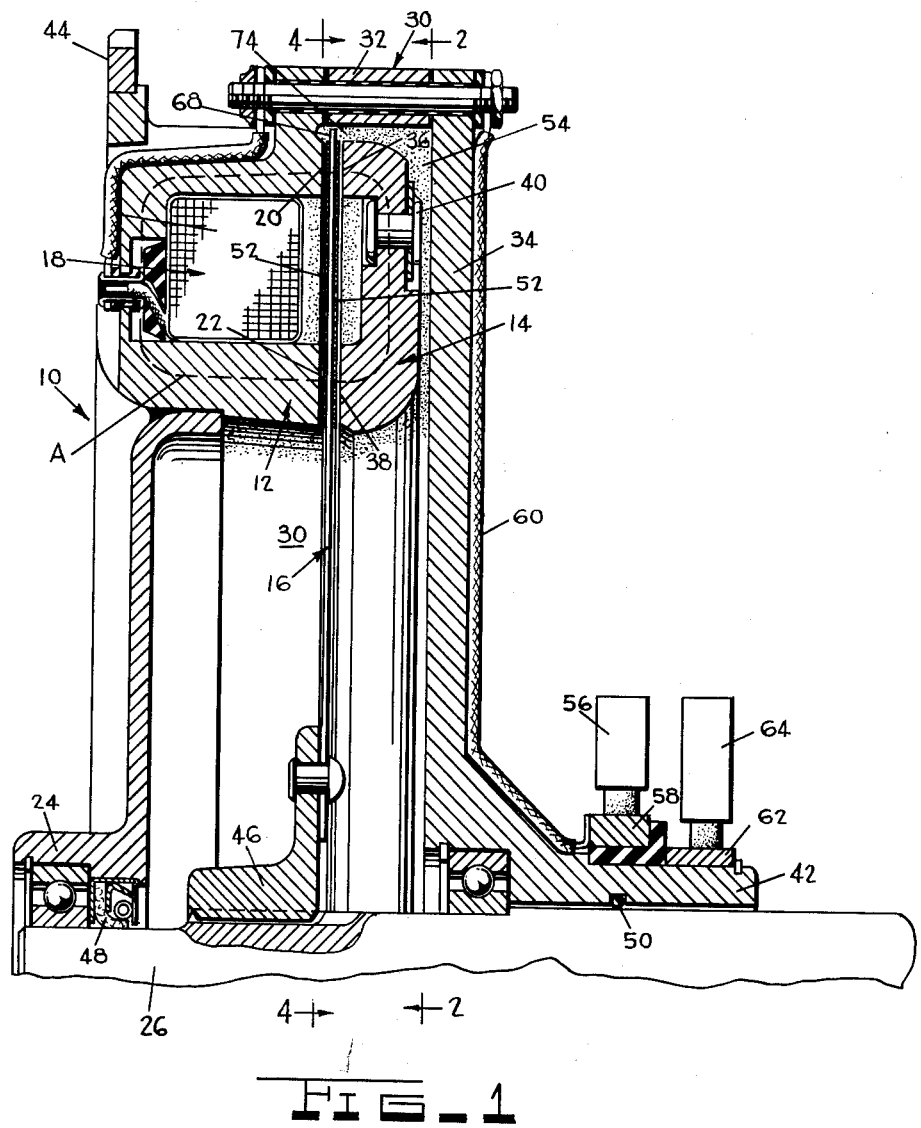
FIG_1
INVENTOR.
MARTIN P. WINTHER
BY
McDonald & Teagno
ATTORNEYS March 13, 1956
M. P. WINTHER
2,738,044
ELECTROMAGNETIC PLATE CLUTCH
Filed Jan. 18, 1951
4 Sheets-Sheet 2
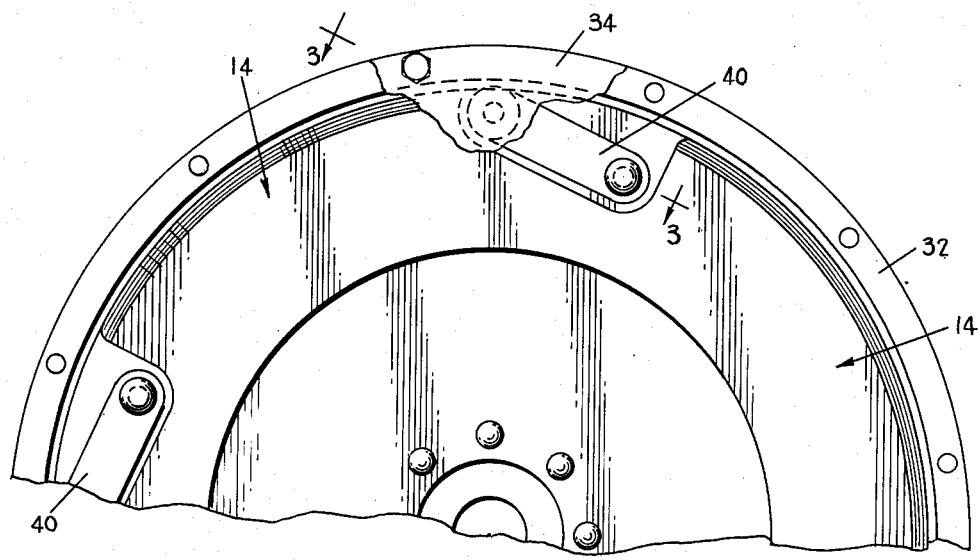
FIG_2
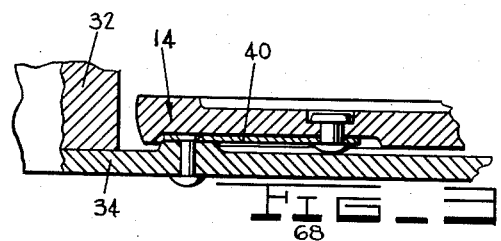
FIG_3
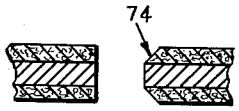
FIG_5
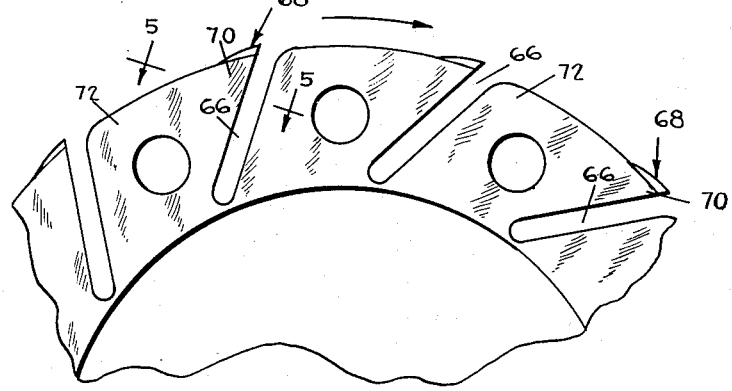
FIG_4
INVENTOR.
MARTIN P. WINTHER
BY
McDonald & Teagno
ATTORNEYS March 13, 1956
M. P. WINTHER
2,738,044
ELECTROMAGNETIC PLATE CLUTCH
Filed Jan. 18, 1951
4 Sheets-Sheet 3
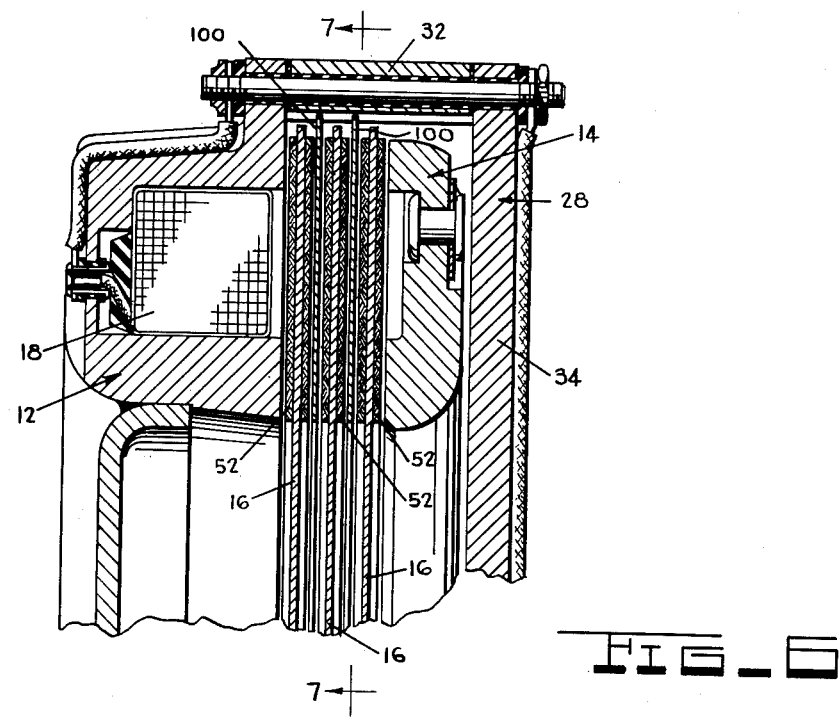
FIG_6
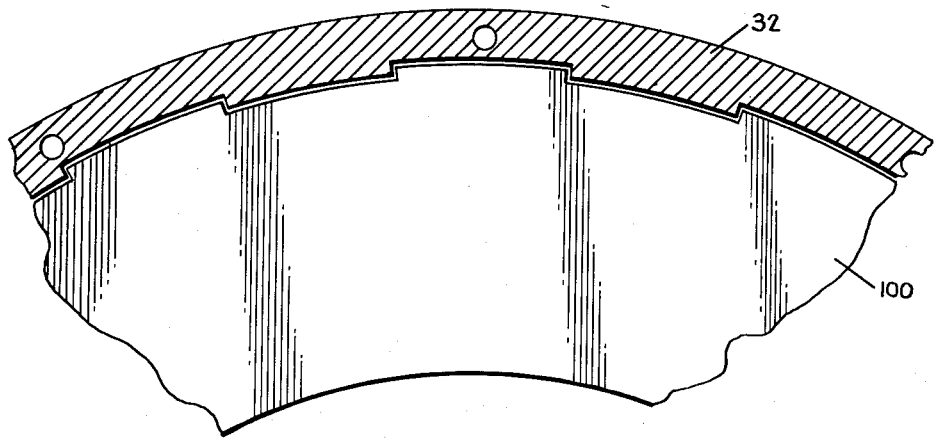
FIG_7
INVENTOR.
MARTIN P. WINTHER
BY
*McDonald & Fragro*
ATTORNEYS March 13, 1956
M. P. WINTHER
2,738,044
ELECTROMAGNETIC PLATE CLUTCH
Filed Jan. 18, 1951
4 Sheets-Sheet 4
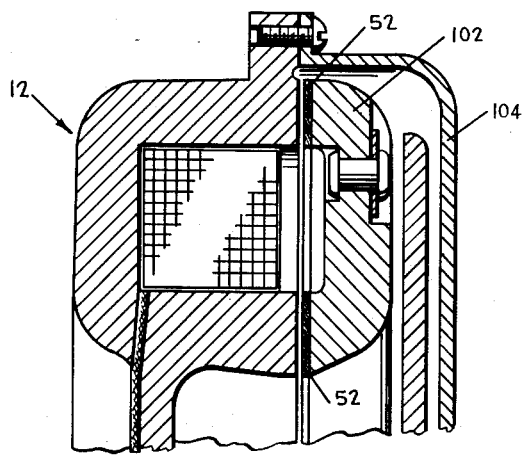
FIG_8
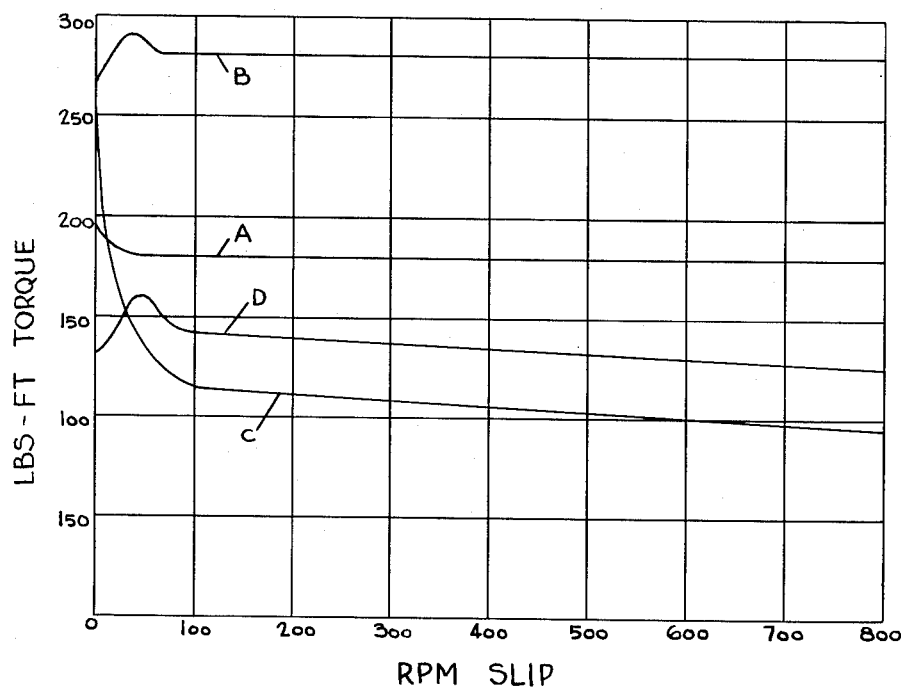
FIG_9
INVENTOR.
MARTIN P. WINTHER
BY
ATTORNEYS

United States Patent Office 2,738,044
Patented Mar. 13, 1956

2,738,044

ELECTROMAGNETIC PLATE CLUTCH

Martin P. Winther, Gates Mills, Ohio, assignor, by mesne assignments, to Eaton Manufacturing Company, Cleveland, Ohio, a corporation of Ohio Application January 18, 1951, Serial No. 206,641

16 Claims. (Cl. 192—21.5)

This invention relates to electromagnetically engaged power transmitting mechanisms and more particularly to an electromagnetic plate clutch or brake employing a magnetic fluid mixture and dependent for operation upon frictional engagement.

Broadly the invention comprehends the provision of an electromagnetic clutch or brake, as the case may be, comprising relatively rotatable normally axially spaced members responsive to a magnetic field to effect a coupling action therebetween, one member having a magnetically permeable friction lining affixed thereto in the space between the relatively rotatable members, a magnetic fluid mixture adapted to be annularly distributed upon rotation of at least one of the relatively rotatable members between the magnetically permeable lining and the other member from which it is normally axially spaced and means for generating a flux field for interlocking the relatively rotatable members, the magnetically permeable lining and the magnetic fluid mixture, whereas the magnetically permeable lining acts to provide a suitable lining friction engaging surface for affording desirable torque transmitting qualities and a reduced magnetic reluctance requiring less magnetomotive force production by a flux field generating source. The magnetic fluid mixture permits of a rapid and smooth closing or coupling action between the relatively rotatable members and an effective torque transmitting and coupling or braking agent between the relatively rotatable members sufficient to insure non-slipping conditions between the members at high torque transmitting or braking capacity.

The magnetic fluid mixture in its capacity to reduce the magnetic reluctance of the flux field effective to minimize the slippance between the relatively rotatable members, provides a rapid yet smooth modulating clutch or brake of very high torque capacity and long life, the latter resulting from the infinitesimal or absence of any wear on the faces of the magnetic permeable lining and the cooperating members of the relatively rotatable members. Upon the cessation of flux generation, the clutched or braked members release effectively and completely remain so released during the absence of flux generation with only slight or no drag imparted thereto by the magnetic fluid mixture.

The invention provides objectively an electromagnetically engaged clutch or brake employing magnetically permeable friction lining and magnetic fluid mixture, said magnetic fluid mixture comprising finely divided magnetic particles and finely divided solid lubricant such as to provide for the frictional engagement of the relatively rotatable members of the electromagnetically engaged clutch or brake in a quick and smooth manner wherein the magnetic fluid mixture affords a clutch or brake of fine control and high torque transmitting qualities.

Other objects and advantages of the invention will be apparent from the following description taken in connection with the drawings forming a part of the specification and in which:

Fig. 1 is a longitudinal section through a clutch embodying the invention;

Fig. 2 is a fragmentary partially sectionalized view illustrating the mounting arrangement of the armature of the clutch of Fig. 1;

Fig. 3 is a fragmentary cross-sectional view taken substantially along the lines 3—3 of Fig. 2;

Fig. 4 is a fragmentary view taken substantially along lines 4—4 of Fig. 1;

Fig. 5 is an enlarged fragmentary cross-sectional view taken substantially along lines 5—5 of Fig. 4;

Fig. 6 is a fragmentary cross-sectional view of a modified form of the clutch shown by Fig. 1;

Fig. 7 is a fragmentary cross-sectional view taken substantially along lines 7—7 of Fig. 6;

Fig. 8 is a fragmentary cross-sectional view of a further modified form of the clutch of Fig. 1; and Fig. 9 is a torque slip chart showing curves of comparative clutch mechanisms.

Similar reference characters indicate corresponding parts throughout several views of the drawings.

The present clutch or brake, as the case may be, was devised primarily for the purpose of providing a mechanism of the type generally shown and described in my co-pending application Ser. No. 133,525, now abandoned, of which this application forms a continuation-in-part, with distinct variation thereover being in the employment of a magnetic fluid mixture comprising finely divided magnetic particles and finely divided solid lubricant as compared to the finely divided magnetic particles and oil fluid mixture employed by the mechanism in my co-pending application. Through the utilization of the magnetic fluid mixture comprising the finely divided magnetic particles and finely divided solid lubricant as more fully defined in Findley Patent No. 2,519,449 in association with magnetically permeable linings such as are more fully defined in co-pending application Ser. No. 133,525, now abandoned, a clutch or brake is provided wherein no wear or solely infinitesimal wear occurs between the frictionally engageable members of the mechanism due to the fact that the magnetic fluid mixture operates to afford a power transmitting as well as lubricating medium between the engageable surfaces.

This magnetic fluid mixture in addition to its minimizing or offsetting any wear between the frictionally engageable surfaces permits of a rapid as well as smooth engagement between the friction surfaces inasmuch as the mixture offers little resistance if any, to the axial movement of the frictional engaging surfaces towards one another for engagement therebetween upon the generation of a flux field between the magnetically respective members of the mechanism.

Although the magnetic fluid mixture herein employed offers little if any resistance to either the relative axial or rotative movement of the relatively rotatable members of the mechanism in which it is used it is extremely effective in providing for the transmission of high torque and maintaining said torque transmission substantially constant over an extended range of slip between said relatively rotatable members, starting at zero slip.

As a means of assuring the effective distribution of the magnetic fluid mixture between the relatively rotatable and frictionally engageable members of the mechanism in which employed, a plurality of circumferential slots of pre-determined width, length and angularity are provided in one of the relatively rotatable members, extending from the periphery of said member toward the axis thereof operative to pick up the magnetic fluid mixture and deliver it to the frictional engaging surfaces of the mechanism. The member having the slots is provided of such diameter and circumferential shape as to present a plurality of circumferentially spaced scoops arranged intermediate the inlet opening of the slots at the periphery of the member effective to extend into an annular zone of the mechanism housing along the inner peripheral wall thereof wherein the magnetic fluid mixture is adapted to collect, for dipping into the mixture and scoop it up for delivery into the slots, passage therethrough onto the friction surfaces and subsequent return to the annular zone of the mechanism housing for recirculation use thereof.

Referring to the drawings for more specific details of the invention 10 represents generally an electromagnetic clutch of a friction plate type comprising basically a pole member 12, an armature or pressure plate 14, a clutch plate 16 axially disposed intermediate the pole member and pressure plate and an electromagnetic coil mounted in the pole member.

The pole member which is U-shaped in cross-section and annular in form has a coil 18, of ring shape nestled therein and provides a pair of annular, concentric, planar pole faces 20 and 22 respectively and is journalled for rotation by way of a flanged hub 24, upon a power output shaft 26.

An enclosure 28 secured to the pole member 12 near its outer periphery for enclosing the pressure plate and clutch plate in a chamber 30 formed in conjunction with the pole member includes an annular ring member 32 and an end plate member 34. The pressure plate 14 is generally U-shaped in cross-section and annular in form as to present pole faces 36 and 38 corresponding to the pole faces on the pole member and is mounted for axial movement relative to the pole member by way of a plurality of equi-spaced spring fingers 40 connected between the enclosure 28 and the pole member. The supporting arrangement between the pole member and the enclosure 28 is more clearly illustrated in Figs. 2 and 3 wherein the pressure plate is moveable axially towards and away from the end plate 34 of the enclosure. The spring members in addition to allowing for axial relative movement between the enclosure and pole member afford by way of the enclosure 28 a fixed relation for the coupled rotation of the pole member and pressure plate as a unit. A hub 42 of the enclosure 28 is journalled on the output shaft 26 axially spaced from the journalled relation of the flanged hub member 24. The pole member and enclosure assembly are driven through a ring gear 44 fixedly secured upon the pole member from an output source, not known. The clutch plate 16 is fixedly secured to a hub member 46 which is, in turn, splined for axial rotation to the power output shaft and extends radially in the chamber 30 between the pole member and pressure plate.

For the purpose of effectively enclosing and sealing the chamber 30 from the atmosphere, the purpose of which will hereinafter appear, seals 48 and 50 respectively are provided in association with hubs of the flanged hub member 24 and the hub 42 of enclosure 28. Annular face linings 52 composed of a material having magnetic reluctance on the order of at least three times the magnetic reluctance of a mild steel, are bonded or otherwise fixedly secured to the opposite sides of the clutch plate complementary to the concentric pole faces of the respective pole member and pressure plate with which they are adapted to have frictional engaging relation when the pressure plate is placed under the influence of a magnetic toroidal circuit "A" established therebetween upon the energization of coil 18.

Although any of several friction linings of high magnetic reluctance can be used, one desirable form of friction lining can be composed of a material including powdered iron, copper, graphite, tin, zinc and lead with combinations of inert material to provide a good long lasting friction lining, the volume of the iron varying according to the applicational use of the clutch or brake to which the lining is applied.

For the purpose of enhancing the qualities of operation of clutch 10 in view of the use of friction linings 52 of high magnetic reluctance and especially wherein it is desirous to have a fine or smooth control of engagement and disengagement thereof as well as rapid engagement and disengagement as occasions the energization or deenergization of the magnetic coil thereof a magnetic fluid mixture 54 of the type defined in Findley Patent No. 2,519,449 is employed. The magnetic fluid mixture should be used in an amount solely sufficient to provide for an ample distribution thereof annularly between the faces of the friction linings and the respective cooperating facings of the pole member, and clutch and plates during the rotation of at least one of the relatively rotatable members of the clutch so as to afford an effective lubrication as well as power transmitting medium when the coil 18 is energized effective to establish toroidal circuit "A" and cause axial electromagnetic movement of the pressure plate toward the pole member.

Current is supplied to coil 18 from a suitably controlled source, not shown, by way of an electrical current conducting brush 56 having rotatable engagement with an insulated conductor ring 58 mounted upon the hub 42 of enclosure 28 which is in turn connected by an electrical conduit 60 thereto, whereas the other end of the coil is grounded by way of the pole member and the enclosure 28 through the hub thereof to a conductor ring 62 secured on the hub 42 having current conducting relationship with a ground brush 64.

In view of the low viscosity of the magnetic fluid mixture and the small quantity used in the clutch, no appreciable drag is imposed on the rotating parts thereof when the coil is deenergized and the clutch is in a state of inoperation. The magnetic fluid mixture which in this case is defined as comprising finely divided magnetic particles and finely divided solid lubricant, operates to form a thin magnetic conducting bridge between the frictional engaging surfaces of the friction linings and respective pole member and pressure plate such that as the pressure plate is magnetically drawn axially towards the pole member with the clutch plate therebetween, the composition of finely divided magnetic particles and finely divided solid lubricant which is distributed therebetween becomes compressed with the results that from time to time a small percentage of the magnetic fluid mixture becomes embedded upon the surface of the friction linings thereby acting to build up the lining rather than cause wear thereof. Because of the finely powdered nature of the magnetic fluid mixture a rapid engagement and disengagement of the clutch is possible as it does not require any great initial axial force to displace the required amount of fluid mixture from between the opposing frictional engaging faces of the clutch members.

For the purpose of effectively distributing the magnetic fluid mixture 54 over the frictional engaging surfaces of the pole member, the clutch plate and the pressure plate a plurality of like circumferentially spaced angularly disposed slots 66 are provided in the clutch plate extending from the outer periphery toward the axis thereof. The slots extend axially throughout the thickness of the plate and linings such that the lining is divided into a plurality of spaced segments and are provided of such width and such length as to afford for the distribution of an ample supply of magnetic fluid mixture under all conditions of operation of the mechanism. The clutch plate is of such diameter as to provide a plurality of scoops 68 intermediate the slots presenting face portions 70 and backs 72 whereby the magnetic fluid mixture is in a sense shoveled up from an annular zone 74 formed on the inner periphery of the enclosure adjacent the external periphery of the pressure and clutch plates by the face portions of the scoops on the clutch plate and forced radially inwardly through the slots. It is to be noted that the slots extend a sufficient distance radially inward toward the axis of the clutch plate as to approach the minor diameter of the frictional engaging surfaces of the pole member and pressure plate but are of a length less than the radial width of the linings thereby preventing the open passage of the magnetic fluid mixture from one end of the slot to the other without distribution across the frictionally engageable surfaces of the mechanism whereas the slot along the edge of friction lining is tapered off at 76 as to permit of the passage of said mixture across the frictionally engageable surfaces and thence radially inwardly past the minor diameter portion of the pole member and pressure plate for subsequent centrifugal distribution to the annular zone 74 for recirculation pickup by scoops 68. The rate of flow of the mixture through the pumping action of the slots is primarily determined by the angularity of the slots wherein the greater the angularity the greater the flow and vice versa.

Reference is had to Fig. 9 wherein a torque slip chart is shown disclosing curves of four comparative types of mechanisms, curve "A" being representative of the operating characteristics of the present mechanism utilizing a magnetically permeable friction lining and a magnetic fluid mixture of dry solid lubricant and finely divided iron powder. Curves B, C and D represent mechanisms of equal size and similar embodiment to the present mechanism utilizing a like friction lining and respectively being operated dry, with oil and with oil and finely divided powder.

By establishing an arbitrary wear factor based upon the number of engagements required to obtain .001 inch wear on the lining divided by 10,000, a wear factor of .27 or 27% is obtained for the mechanism represented by curve B wherein the lining is utilized dry.

The curve C, for a mechanism having a friction lining such as the mechanisms represented by the other curves, and utilizing oil in connection with said lining, for the purpose of improving the wear factor thereof, represents the fact that although the static torque remains the same for the mechanisms of curves B and C the mechanism of curve C has a very much reduced capacity for picking up loads and for continual slipping the torque capacity was satisfactory when limited to a minimum slip of 50 R. P. M. The wear factor of this mechanism is increased to .55 or 55%. As for the mechanism of curve D employing like friction lining as the other mechanisms and utilizing a magnetic fluid mixture of oil and finely divided powder, a wear factor of .62 or 62% as compared to the mechanisms of curves B and C is obtained whereas the torque capacity of this mechanism is higher than of the mechanism of curve C.

The mechanism of the present invention represented by the curve A using dry solid lubricant and finely divided iron powder in association with the friction lining achieves a comparable wear factor of 98% with respect to the other mechanisms and at the same time has a higher torque capacity than either of the mechanisms represented by curves C and D.

Although it is to be understood that the mechanisms represented by the curves each has characteristics lending itself to some particular use, the mechanism herein devised as represented by curve A is best suited for all around purposes.

Figure 6 illustrates the modification of a structure disclosed by Fig. 1 in the provision of a plurality of clutch plates 16 adapted to be mounted in a similar manner to the clutch plate 16 of the structure of Fig. 1 whereas the end clutch plates 16 are adapted to have frictional engagement by way of their friction linings 52 with the complementary annular pole faces of the pole member 12 and pressure plate 14. A pair of identical plates 100 are axially interposed between the end clutch plates 16 and the middle clutch plate 16 having frictional engagement relation with the annular linings of the respective clutch plates 16 on the opposite sides thereof. The plates 100 are splined for axial movement at their outer periphery upon end plate 32 of the enclosure 28 so as to be rotatable therewith upon the induced rotation of pole member 12.

The clutch mechanism of Fig. 6 is adapted to operate in a similar manner to the clutch of Fig. 1, the sole difference thereover being that because of the arrangement of the clutch plate 16 and plates 100 a higher capacity operating clutch mechanism is provided due to the increased frictional engagement area afforded between the frictional related plates. For the purpose of assuring the passage of the magnetic flux lines about the coil 18 and through the pole member, armature, clutch plates, friction lining, and plates 16, the plates are preferably made of a metallic composition permitting of a free flow of magnetic flux therethrough.

A further modification of the clutch mechanism of Figs. 1 and 5 is illustrated by Fig. 8 wherein cooperative input and output members are arranged in coaxially spaced relation to one another and wherein in the case of this structure the pole member 12 represents the input member of the mechanism such as in the structure of Figs. 1 and 5 but wherein the armature 102 operates as the output member thereof, said member being appropriately connected to an output shaft, not shown.

A suitable enclosure 104 is arranged about the armature to enclose it within a chamber 106, within which a magnetic fluid mixture is placed, for the purpose of retaining the magnetic fluid mixture therein. In its utilization between the respective pole and armature members 12 and 102, an annular lining 52 of the type employed in the previously defined structures, is fixedly secured to the pole faces of the armature such that the pole faces of the pole member have frictional engagement relationship therewith. It is readily conceivable that a like result and somewhat similar structure would be had comparable thereto merely by the arrangement of the friction lining upon the pole faces of the pole member instead of the pole faces of the armature, whereby the pole faces of the armature would have engagement upon the friction lining secured to the pole member.

Although the mechanism of this invention has been defined and disclosed more or less specifically in terms of a clutch, it is equally and effectively adaptable as a brake mechanism and also with alterations and structure susceptible to those skilled in the art is adaptable to a plurality of applicable uses. Accordingly, the invention is to be so limited wherein in the claims the expression "clutch" will be used generally and not in the limiting sense.

What I claim is:

1. An electromagnetic clutch comprising relatively rotatable magnetic members which are spaced apart, each member having at least one frictionally engageable surface, means for inductively magnetizing said members to actuate them towards one another, magnetically permeable lining means on at least one of the members interposed in the space between the magnetic members, said lining comprising a wear and heat resistant frictional substance having a relatively high reluctance to flux and being interspersed with particles of magnetic material of relatively low reluctance to flux, said particles reducing the overall magnetic reluctance of the lining to a value below that of said wear and heat resistant frictional substance but above that of said magnetic members and a magnetic fluid mixture between the frictionally engageable surfaces of the members and the lining, one of said members having pumping means in the form of a plurality of circumferentially spaced angular slots extending from open relation at the external periphery of the member, in which they are located, toward the axis thereof effective to draw the magnetic mixture radially inwardly from the external periphery of the members towards the axes thereof.

2. An electromagnetic clutch comprising relatively rotable magnetic members which are spaced apart, each member having at least one frictionally engageable surface, means for inductively magnetizing said members to actuate them towards one another, magnetically permeable lining on at least one of the members interposed in the space between the magnetic members, said lining comprising a wear and heat resistant frictional substance having a relatively high reluctance to flux and being interspersed with articles of magnetic material of relatively low reluctance to flux, said particles reducing the overall magnetic reluctance of the lining to a value below that of said wear and heat resistant frictional substance but above that of said magnetic members and a magnetic fluid mixture between the frictionally engageable surfaces of the members and the lining means, said mixture comprising finely divided magnetic particles and finely divided solid lubricant.

3. A clutch according to claim 2 wherein the lining has a magnetic reluctance on the order of three times the magnetic reluctance of a mild steel.

4. A clutch according to claim 2 wherein the relatively rotatable members include a driving structure and a driven structure.

5. A clutch according to claim 2 wherein means is provided in one of the members for pumping the mixture between the frictionally engageable surfaces.

6. A clutch according to claim 2 wherein the finely divided magnetic particles are iron and wherein the finely divided solid lubricant is graphite.

7. A clutch according to claim 4 wherein the driving structure includes a pole member and a pressure plate spaced apart and mounted for non-rotative but relative axial movement toward and away from one another and the driven structure includes a clutch plate interposed in the space between the pole member and pressure plate.

8. A clutch according to claim 4 wherein the driving structure includes a pole member, a pressure plate and at least one intermediate plate mounted for non-rotative but axial movement thereon and the driven structure includes at least two clutch plates alternatively arranged in axially spaced relation to the pole member, the intermediate plate and pressure plate.

9. A clutch according to claim 5 wherein the pumping means is in the form of a plurality of circumferentially spaced angular slots extending from open relation at the external periphery of the member in which they are located toward the axis thereof effective to draw the magnetic mixture radially inwardly from the external periphery of the members toward the axes thereof.

10. A clutch according to claim 7 wherein the lining is securely fixed to the clutch plate on opposite faces thereof for engagement with the respective friction engaging surfaces of the pole member and pressure plate.

11. A clutch according to claim 7 wherein the pole member, pressure plate and clutch plate are enclosed to provide a chamber in association therewith and wherein the magnetic fluid mixture is retained within the chamber for distribution between the pole member and pressure plate.

12. A clutch according to claim 7 wherein means in the form of a plurality of circumferentially spaced angular slots are provided in the clutch plate for pumping the mixture between the frictionally engageable surfaces of the pole member, pressure plate and clutch plate, said slots extending in the direction of relative rotation between the clutch plate and pole member and pressure plate.

13. A clutch according to claim 9 wherein the member having the slots is provided with radially extended scoops on the external periphery thereof circumferentially intermediate the slots.

14. A clutch according to claim 11 wherein the pressure plate is mounted for axial movement relative to the pole member on an enclosure member securely affixed to the pole member enclosing the clutch and pressure plate in a chamber formed within the pole member and enclosure member.

15. A clutch according to claim 12 wherein the slots extend from open relation at the external periphery of the clutch plate angularly toward the axis thereof away from a true radius line and wherein the clutch plate is provided with a plurality of circumferentially spaced scoops on the external periphery thereof intermediate the slots.

16. A clutch according to claim 15 wherein the scoops extend radially outward beyond the maximum diameter of the frictional engaging surfaces of the pole member and pressure plate.

References Cited in the file of this patent

UNITED STATES PATENTS

| Number | Name | Date |
|---|---|---|
| 754,291 | Eastwood | Mar. 8, 1904 |
| 762,622 | Eastwood | June 14, 1904 |
| 1,925,956 | Easter | Sept. 5, 1933 |
| 2,359,361 | Gleszer et al. | Oct. 3, 1944 |
| 2,519,449 | Findley | Aug. 22, 1950 |
| 2,580,869 | Winther | Jan. 1, 1952 |
| 2,601,076 | Winther | June 17, 1952 |

OTHER REFERENCES

Electronics, "Magnetic Fluid Clutch in Servo Applications," November 1949, pp. 100 to 103.

General Electric Review, "Magnetic Fluid Clutch," December 1949, pp. 39 to 43.